US012009726B2

(12) United States Patent
Mori et al.

(10) Patent No.: US 12,009,726 B2
(45) Date of Patent: Jun. 11, 2024

(54) VACUUM PUMP AND MAGNETIC-BEARING-INTEGRATED MOTOR

(71) Applicant: SHIMADZU CORPORATION, Kyoto (JP)

(72) Inventors: Takahiro Mori, Kyoto (JP); Tsunehiro Inoue, Kyoto (JP); Tomoo Ota, Kyoto (JP); Masatsugu Takemoto, Sapporo (JP); Yu Fu, Sapporo (JP)

(73) Assignee: SHIMADZU CORPORATION, Kyoto (JP)

( * ) Notice: Subject to any disclaimer, the term of this patent is extended or adjusted under 35 U.S.C. 154(b) by 253 days.

(21) Appl. No.: 17/612,087

(22) PCT Filed: May 24, 2019

(86) PCT No.: PCT/JP2019/020688
§ 371 (c)(1),
(2) Date: Nov. 17, 2021

(87) PCT Pub. No.: WO2020/240621
PCT Pub. Date: Dec. 3, 2020

(65) Prior Publication Data

US 2022/0216767 A1 Jul. 7, 2022

(51) Int. Cl.
*H02K 7/09* (2006.01)
*F04D 19/04* (2006.01)
(Continued)

(52) U.S. Cl.
CPC ............... *H02K 7/09* (2013.01); *F04D 19/04* (2013.01); *F04D 25/06* (2013.01); *F16C 32/0474* (2013.01); *H02K 21/20* (2013.01)

(58) Field of Classification Search
CPC ............ H02K 1/278; H02K 1/20; H02K 7/09; H02K 1/27; H02K 7/14; H02K 21/20;
(Continued)

(56) References Cited

U.S. PATENT DOCUMENTS 6,278,251 B1    8/2001    Schob
6,297,574 B1    10/2001    Schob et al.
(Continued)

FOREIGN PATENT DOCUMENTS

CN    204597667 U    8/2015
EP    0 989 656 B1    3/2000
(Continued)

OTHER PUBLICATIONS

Matsuzaki et al., "Novel Structure of Three-Axis Active-Control-Type Magnetic Bearing for Reducing Rotor Iron Loss", IEEE Trans. On magnetics vol. 52 No. Jul. 7, 2016.
(Continued)

*Primary Examiner* — Philip E Stimpert
(74) *Attorney, Agent, or Firm* — Muir Patent Law, PLLC

(57) ABSTRACT

A vacuum pump (100) includes a rotor (22b), a rotor blade (13), and a magnetic-bearing-integrated stator (22a) including a coil. The rotor includes a pair of spacer members (29), a support member (27), a permanent magnet (26), and a protective ring (28), and in an axial direction of a rotary shaft (11), the support member has a mechanical strength higher than that of the protective ring.

16 Claims, 10 Drawing Sheets

(51) Int. Cl.
*F04D 25/06* (2006.01)
*F16C 32/04* (2006.01)
*H02K 21/20* (2006.01)

(58) Field of Classification Search
CPC .................... F04D 25/06; F04D 19/04; F04D 13/0606–13/064; F04D 29/08; F16C 32/0474
See application file for complete search history.

(56) References Cited

U.S. PATENT DOCUMENTS

| | | | |
|---|---|---|---|
| 6,350,109 B1* | 2/2002 | Brunet | F16C 32/047 417/423.12 |
| 6,351,048 B1 | 2/2002 | Schob et al. | |
| 2010/0231076 A1 | 9/2010 | Chiba et al. | |
| 2013/0106018 A1* | 5/2013 | Ekberg | H02K 5/124 264/275 |

FOREIGN PATENT DOCUMENTS

| | | | | |
|---|---|---|---|---|
| JP | 3854998 | B2 | 9/2006 | |
| JP | 4616405 | B2 | 10/2010 | |
| JP | 5892628 | B2 | 3/2016 | |
| JP | 2016-192877 | A | 11/2016 | |
| JP | 2016192877 | A * | 11/2016 | |
| WO | WO-03085802 | A1 * | 10/2003 | ............. H02K 1/278 |

OTHER PUBLICATIONS

Written Opinion from the International Search Authority dated Aug. 27, 2019, for PCT application No. PCT/JP2019/020688.
First Office Action dated Mar. 27, 2023 issued in relation to the corresponding Chinese Patent Application No. 201980096218.2 together with a machine translation thereof.

* cited by examiner (THIRD MODIFIED EXAMPLE)

(FIFTH MODIFIED EXAMPLE)

VACUUM PUMP AND MAGNETIC-BEARING-INTEGRATED MOTOR

TECHNICAL FIELD

The present invention relates to a vacuum pump and a magnetic-bearing-integrated motor.

BACKGROUND ART

Conventionally, a vacuum pump including a magnetic-bearing-integrated motor is known. Such a vacuum pump is disclosed in Japanese Patent No. 3854998, for example.

Japanese Patent No. 3854998 discloses a bearingless motor used in a vacuum pump such as a turbomolecular pump. The bearingless motor disclosed in Japanese Patent No. 3854998 includes a rotor, a stator, and permanent magnets. In the bearingless motor disclosed in Japanese Patent No. 3854998, the permanent magnets are arranged such that the polarity orientations of the magnetic poles are opposite to each other in the radial direction of the rotor. Furthermore, in the bearingless motor disclosed in Japanese Patent No. 3854998, a support magnetic flux generated by a current flowing through a support winding wire provided in the stator penetrates the salient poles arranged between the permanent magnets. With this configuration, the stator generates a bearing force to magnetically support the rotor in a non-contact manner.

In the bearingless motor disclosed in Japanese Patent No. 3854998, a fixing member is provided on the outer peripheries of the permanent magnets in order to prevent scattering of the permanent magnets due to a centrifugal force generated by rotation of the rotor. Although not disclosed in Japanese Patent No. 3854998, the fixing member for preventing the scattering of the permanent magnets is conceivably made of stainless steel, for example, so as not to be damaged by a pressure applied during assembly of the rotor.

PRIOR ART

Patent Document

Patent Document 1: Japanese Patent No. 3854998

SUMMARY OF THE INVENTION

Problems to be Solved by the Invention

However, for example, when the annular fixing member for preventing scattering of the permanent magnets is made of stainless steel, a magnetic flux for generating a bearing force for magnetic support causes an eddy current in the fixing member. When an eddy current is generated in the fixing member, the power consumption becomes excessive, and power for driving the motor and power for generating the bearing force for magnetic support are disadvantageously lost. Therefore, the fixing member is made of a non-conductive material such as resin such that eddy current generation in the fixing member is conceivably significantly reduced or prevented. However, when the fixing member is made of resin, for example, the fixing member may be damaged by a pressure during assembly of the rotor.

The present invention is intended to solve at least one of the above problems. The present invention aims to provide a vacuum pump and a magnetic-bearing-integrated motor capable of significantly reducing or preventing damage to a fixing member during assembly and capable of reducing a loss caused by an eddy current generated in the fixing member.

Means for Solving the Problems

In order to attain the aforementioned object, a vacuum pump according to a first aspect of the present invention includes a rotor including a rotary shaft having an axial direction, a rotor blade provided on the rotary shaft, and a magnetic-bearing-integrated stator including a coil configured to apply a rotational force to rotationally drive the rotor and a bearing force to magnetically support the rotor. The rotor includes a pair of spacer members, a support member provided on an outer circumference of the rotary shaft to receive a pressure applied in the axial direction during assembly via the pair of spacer members, a permanent magnet provided so as to surround an outer circumference of the support member, and a non-conductive protective ring having an annular shape, the protective ring being provided on an outer circumference of the permanent magnet in non-contact with the pair of spacer members in the axial direction. In the axial direction of the rotary shaft, the support member has a mechanical strength higher than that of the protective ring. The non-conductive protective ring includes an insulator or a semiconductor. The mechanical strength in the axial direction refers to a strength (rigidity) with respect to a compressive load in the axial direction.

A magnetic-bearing-integrated motor according a second aspect of the present invention includes a rotor including a rotary shaft having an axial direction, and a magnetic-bearing-integrated stator including a coil configured to apply a rotational force to rotationally drive the rotor and a bearing force to magnetically support the rotor. The rotor includes a pair of spacer members, a support member provided on an outer circumference of the rotary shaft to receive a pressure applied in the axial direction during assembly via the pair of spacer members, a permanent magnet provided so as to surround an outer circumference of the support member, and a non-conductive protective ring having an annular shape, the protective ring being provided on an outer circumference of the permanent magnet in non-contact with the pair of spacer members in the axial direction. In the axial direction of the rotary shaft, the support member has a mechanical strength higher than that of the protective ring.

Effect of the Invention

According to the first aspect of the present invention, as described above, the rotor includes the pair of spacer members, the support member to receive a pressure applied in the axial direction during assembly via the pair of spacer members, the permanent magnet provided on the outer circumference of the support member, and the non-conductive protective ring having an annular shape, the protective ring being provided on the outer circumference of the permanent magnet, and in the axial direction of the rotary shaft, the support member has a mechanical strength higher than that of the protective ring. The support member is provided such that damage to the protective ring during assembly can be significantly reduced or prevented. Furthermore, the non-conductive protective ring is provided such that a loss caused by an eddy current generated in the protective ring can be reduced. Thue, damage to the protective ring during assembly can be significantly reduced or prevented, and a loss caused by an eddy current generated in the protective ring can be reduced.

According to the second aspect of the present invention, with the configuration described above, it is possible to provide the magnetic-bearing-integrated motor capable of significantly reducing or preventing damage to the protective ring during assembly and reducing a loss caused by an eddy current generated in the protective ring, similarly to the vacuum pump according to the first aspect.

MODES FOR CARRYING OUT THE INVENTION

An embodiment embodying the present invention is hereinafter described on the basis of the drawings.

The configuration of a magnetic-bearing-integrated motor 22 and the configuration of a vacuum pump 100 including the magnetic-bearing-integrated motor 22 according to the embodiment of the present invention are now described with reference to FIGS. 1 to 7.

Configuration of Vacuum Pump

Figure 1:
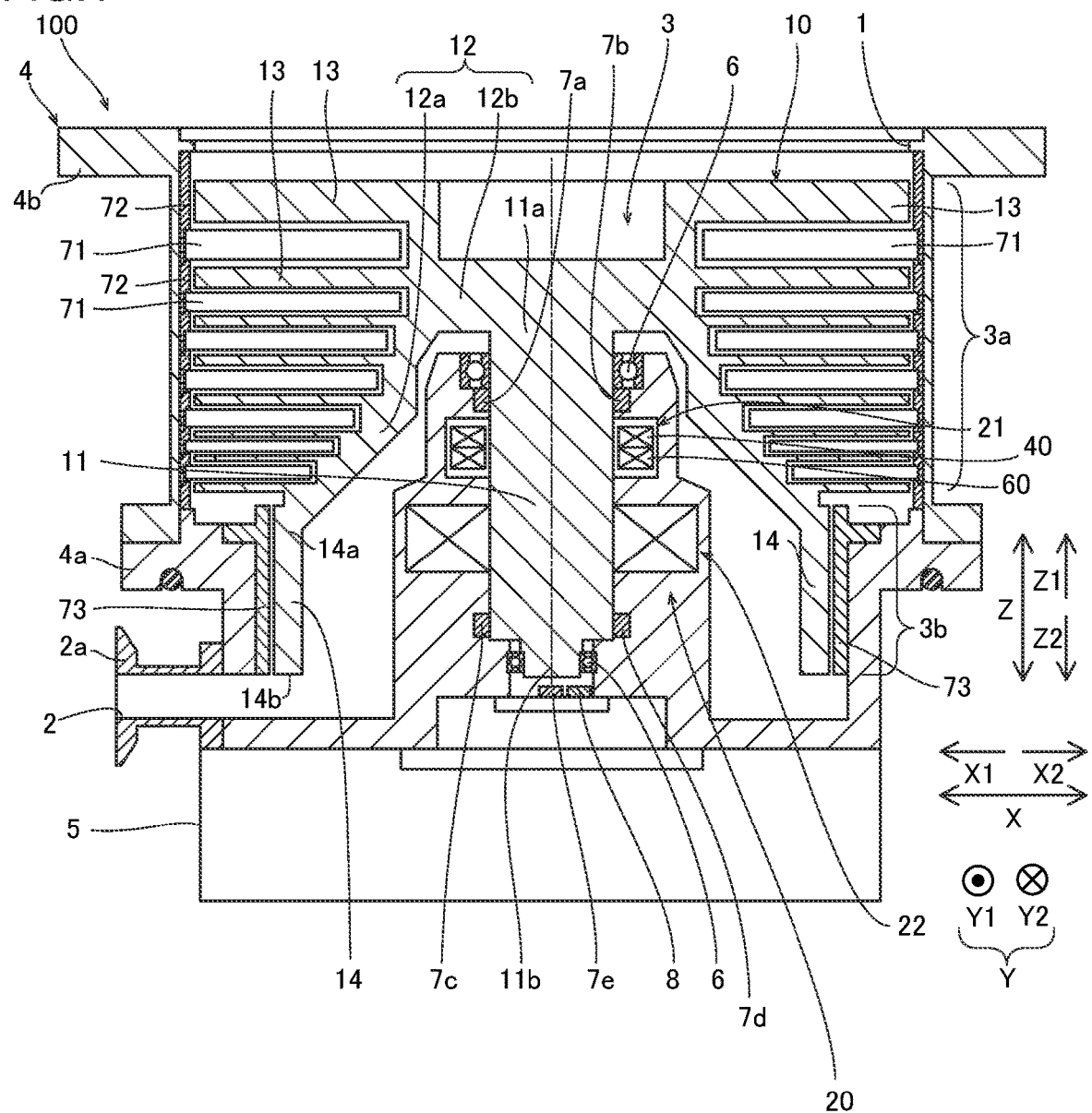
FIG. 1 is a sectional view schematically showing the overall configuration of a vacuum pump.

As shown in FIG. 1, the vacuum pump 100 is a pump to discharge gas from a container and evacuate (reducing the pressure) the container. The term "vacuum" refers to a state of pressure lower than the atmospheric pressure around the vacuum pump 100.

The vacuum pump 100 includes at least one intake port 1, at least one exhaust port 2, and at least one pump 3. The vacuum pump 100 suctions gas from the intake port 1 into the pump 3 by the operation of the pump 3, and discharges the suctioned gas from the exhaust port 2. The vacuum pump 100 includes a housing 4 to house the pump 3. In an example of FIG. 1, one intake port 1 is formed in the housing 4, and one pump 3 is housed in the housing 4. An exhaust pipe 2a formed with the exhaust port 2 is connected to the housing 4. The exhaust port 2 communicates with the intake port 1 via the exhaust pipe 2a and the pump 3.

In the example of FIG. 1, the vacuum pump 100 includes a control unit 5 to control the operation of the pump 3. The control unit 5 is attached to the bottom of the housing 4. The control unit 5 may be provided separately from the vacuum pump 100 and may be communicably connected to the vacuum pump 100 by wire or wirelessly.

Pump

The pump 3 includes a rotary body 10 and a rotation mechanism 20. The rotary body 10 and the rotation mechanism 20 are housed in the housing 4. When the rotary body 10 is rotationally driven by the rotation mechanism 20, a gas suction force is generated between the rotary body 10 and the housing 4.

In the configuration example of FIG. 1, the pump 3 includes a first pump structure 3a and a second pump structure 3b. In the example of FIG. 1, the vacuum pump 100 is a composite vacuum pump with the first pump structure 3a and the second pump structure 3b connected in series. The gas taken into the pump 3 from the intake port 1 passes through the first pump structure 3a and the second pump structure 3b in this order, and is discharged from the exhaust port 2.

The rotary body 10 includes a rotary shaft 11, a blade support 12, and rotor blades 13. The rotary body 10 is provided such that the rotary shaft 11, the blade support 12, and the rotor blades 13 rotate integrally. The first pump structure 3a with the rotor blades 13 of the rotary body 10 and stator blades 71 of the housing 4 forms a turbomolecular pump. The rotary body 10 includes a cylindrical portion 14 extending from the blade support 12 toward a second end 11b of the rotary shaft 11 and forming the second pump structure 3b between the cylindrical portion 14 and the housing 4. The rotary body 10 is provided such that the rotor blades 13 forming the first pump structure 3a and the cylindrical portion 14 forming the second pump structure 3b rotate integrally.

The second pump structure 3b with the cylindrical portion 14 of the rotary body 10 described below and a pump stator 73 of the housing 4 forms a molecular drag pump.

A direction in which the central axis of the rotary shaft 11 extends is hereinafter referred to as the axial direction or the thrust direction. The radial direction of the rotary shaft 11 is simply referred to as the radial direction. In each figure, the axial direction is defined as a Z direction. A Z1 direction in the Z direction is referred to as the first end 11a side, and a Z2 direction is referred to as the second end 11b side.

As shown in FIG. 1, the rotation mechanism 20 includes a magnetic-bearing-integrated motor 22 to rotationally drive the rotary body 10 and magnetically support the rotary body 10. The rotation mechanism 20 is provided so as to surround the rotary shaft 11 centering on the rotary shaft 11.

Figure 4:
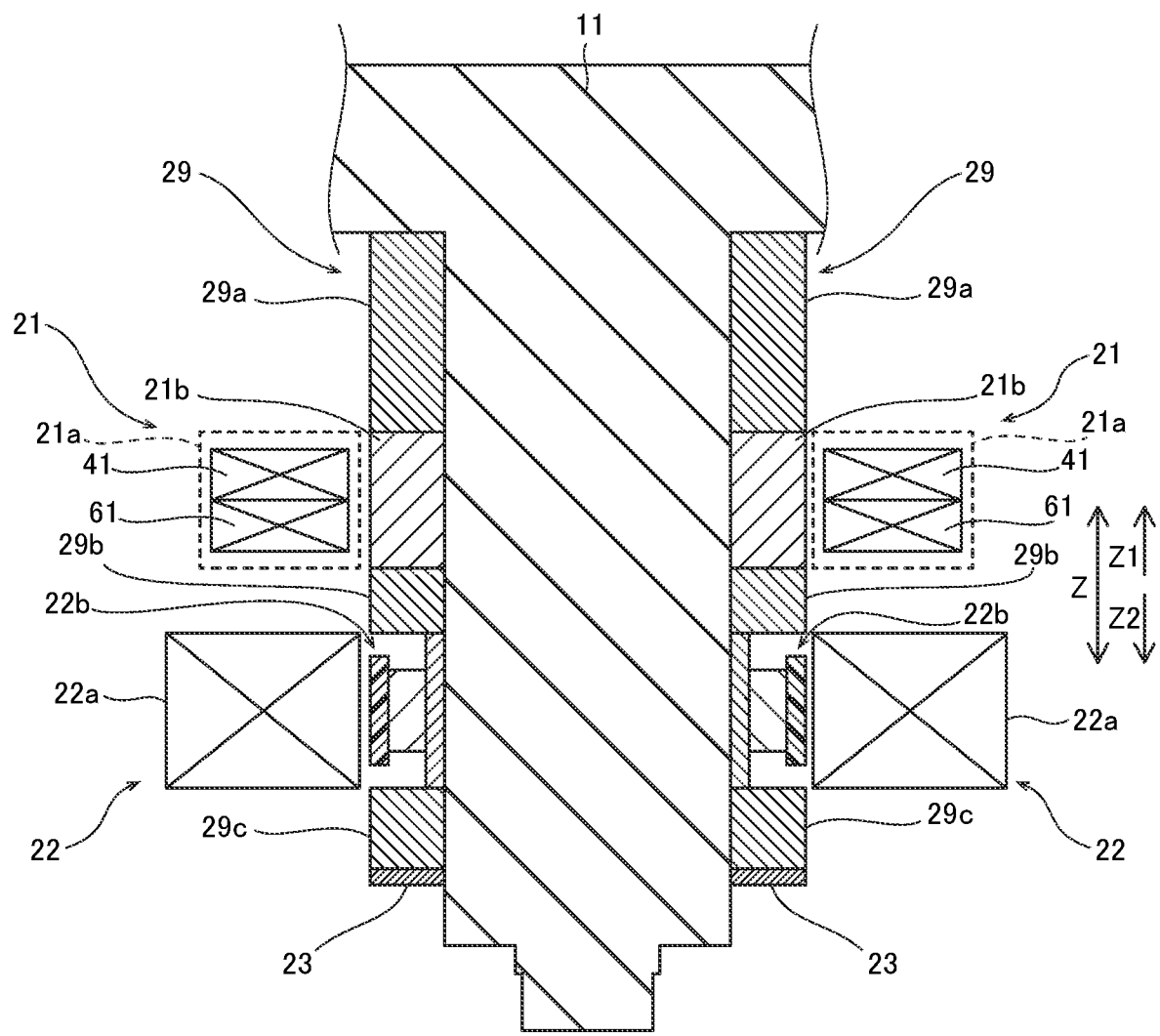
FIG. 4 is a schematic sectional view showing the magnetic bearing unit and the motor unit as viewed in the radial direction.

The magnetic-bearing-integrated motor 22 includes a motor stator 22a (see FIG. 4) and a motor rotor 22b (see FIG. 4). The motor rotor 22b includes the rotary shaft 11 having an axial direction. The motor stator 22a is configured to apply a rotational force to rotationally drive the motor rotor 22b and a bearing force to magnetically support the motor rotor 22b. The motor stator 22a and the motor rotor 22b are examples of a "magnetic-bearing-integrated stator" and a "rotor" in the claims, respectively.

The magnetic bearing is a 5-axis magnetic bearing including two sets of radial magnetic bearings and one set of thrust magnetic bearings. The term "5-axis" indicates that a position control and an attitude control are possible in five directions including three directions in the translation direction of the rotary body 10 and two directions in the tilt direction of the rotary body 10.

That is, the rotation mechanism 20 includes a first radial magnetic bearing 40 and the magnetic-bearing-integrated motor 22 that functions as a second radial magnetic bearing, both of which are provided around the rotary shaft 11. The rotation mechanism 20 includes a thrust magnetic bearing 60 provided around the rotary shaft 11. The magnetic bearing magnetically levitates the rotary body 10 to support the rotary body 10 in non-contact with the rotary body 10 such that the rotary body 10 is rotatable.

One set of radial magnetic bearings enable a position control (two axes) in two radial directions (defined as an X direction and a Y direction) orthogonal to each other. Two sets of radial magnetic bearings arranged side by side in the axial direction enable an attitude control of tilt around the X direction and the Y direction. The thrust magnetic bearing enables a position control (one axis) in the thrust direction (Z direction).

In this embodiment, the rotation mechanism 20 includes at least a magnetic bearing unit 21 and the magnetic-bearing-integrated motor 22. The magnetic bearing unit 21 includes at least the first radial magnetic bearing 40. In this embodiment, in the configuration example of FIG. 1, the magnetic bearing unit 21 is a single unit integrally including the first radial magnetic bearing 40 and the thrust magnetic bearing 60. The magnetic-bearing-integrated motor 22 is a unit that operates as both a motor that rotates the rotary shaft 11 and a second radial magnetic bearing that magnetically supports the rotary shaft 11. Such a structure that operates as both a motor that rotates the rotary shaft 11 and a second radial magnetic bearing eliminates the need for a set of radial magnetic bearings usually provided separately from the motor, and thus it is called a bearingless motor or a self-bearing motor, for example. That is, the term "magnetic-bearing-integrated motor" refers to a motor that rotates the rotary shaft 11 at the same position in the axial direction and functions as a magnetic bearing of the rotary shaft 11. The detailed configuration of the magnetic bearing unit 21 and the magnetic-bearing-integrated motor 22 is described below.

The housing 4 includes a base 4a and a case 4b. The rotation mechanism 20 is provided on the base 4a, and the rotary shaft 11 of the rotary body 10 is inserted thereinto. The exhaust pipe 2a is connected to the base 4a. The case 4b is attached to the upper surface of the base 4a. The case 4b has a cylindrical shape so as to surround the rotary body 10 installed on the base 4a, and the intake port 1 is formed on the upper surface thereof.

The vacuum pump 100 includes a plurality of mechanical bearings 6, a plurality of displacement sensors 7a, 7b, 7c, 7d, and 7e, and a rotation sensor 8. The plurality of mechanical bearings 6 are provided on the base 4a in the vicinity of the first end 11a of the rotary shaft 11 and in the vicinity of the second end 11b of the rotary shaft 11. The mechanical bearings 6 can come into contact with the rotary shaft 11 to support the rotary shaft 11 in the radial direction and the thrust direction. The mechanical bearings 6 are touch-down bearings that support the rotary body 10 instead of the magnetic bearing when the magnetic bearing is not operating (when the rotary body 10 is not magnetically levitated) or when a disturbance occurs. When the magnetic bearing operates, the mechanical bearings 6 and the rotary shaft 11 (rotary body 10) do not contact each other.

Figure 3:
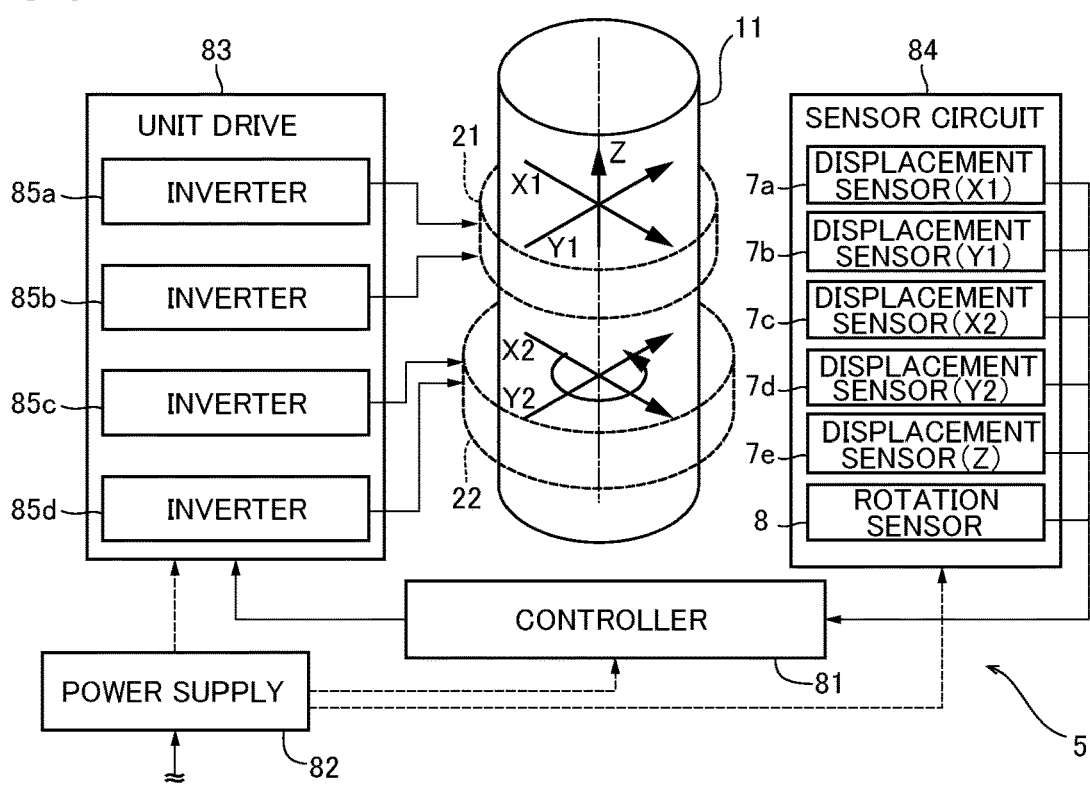
FIG. 3 is a block diagram illustrating the control configuration of the vacuum pump.

As shown in FIG. 3, the displacement sensors 7a to 7d detect displacements of the rotary shaft 11 in the radial direction (an X1 direction, a Y1 direction, an X2 direction, and a Y2 direction). The displacement sensor 7e detects a displacement of the rotary shaft 11 in the thrust direction (Z direction). The rotation sensor 8 detects the rotation angle of the rotary shaft 11.

The control unit 5 includes a controller 81, a power supply 82, a drive unit 83, and a sensor circuit 84.

The power supply 82 acquires power from an external power supply and supplies power to the controller 81, the drive unit 83, and the sensor circuit 84. The power supply 82 performs power conversion to convert AC power from the outside into DC power.

The drive units 83 controls supply of a drive current to the rotation mechanism 20 based on a control signal from the controller 81. The current is controlled in the drive unit 83 such that the magnetic-bearing-integrated motor 22 of the rotation mechanism 20 generates a driving force (torque) in the rotation direction, and the magnetic bearing generates a bearing force in each direction. The drive unit 83 includes inverters 85a and 85b to control current supply to the magnetic bearing unit 21. The drive unite 83 includes inverters 85c and 85d to control current supply to the magnetic-bearing-integrated motor 22. Each of the inverters 85a to 85d includes a plurality of switching elements.

The sensor circuit 84 includes the displacement sensors 7a to 7e and the rotation sensor 8, and includes a circuit that performs a conversion process to input each sensor signal to the controller 81, etc. Each sensor signal of the displacement sensors 7a to 7e and the rotation sensor 8 is input from the sensor circuit 84 to the controller 81.

The controller 81 includes a computer including a processor such as a central processing unit (CPU) or a field programmable gate array (FPGA) and a volatile and/or non-volatile memory.

The controller 81 controls the operation of the rotation mechanism 20 via the drive unit 83. The controller 81 acquires a sensor signal in each direction from the sensor circuit 84, and outputs a control signal to perform an on/off control on the plurality of switching elements provided in the inverters 85a, 85b, and 85d based on the acquired sensor signal. Thus, the controller 81 controls each magnetic bearing such that the rotary body 10 does not contact any fixed element of the vacuum pump 100 during the operation of the vacuum pump 100.

The controller 81 outputs a control signal to perform an on/off control on the plurality of switching elements provided in the inverter 85c based on the sensor signal of the rotation sensor 8. Thus, the controller 81 controls the magnetic-bearing-integrated motor 22 based on the rotation position of the rotary body 10.

Structure of Rotary Body

Figure 2:
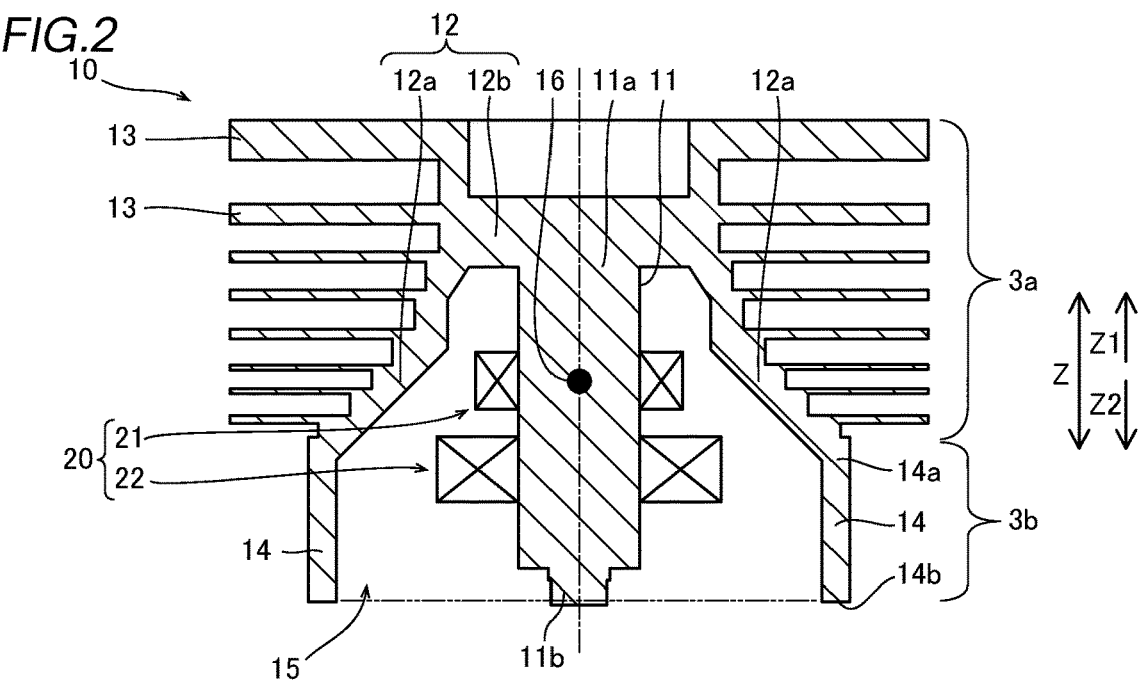
FIG. 2 is a schematic view showing an arrangement of a rotary body, a magnetic bearing unit, and a motor unit.

As shown in FIG. 2, the rotary shaft 11 is a columnar member having the first end 11a and the second end 11b and extending in the axial direction. In the example of FIG. 1, the first end 11a is the upper end of the rotary shaft 11, and the second end 11b is the lower end of the rotary shaft 11. The rotary shaft 11 is supported by the rotation mechanism 20 rotatably around the central axis. Furthermore, the rotary shaft 11 is rotationally driven around the central axis by the rotation mechanism 20. In the example of FIG. 1, an example of a vertical vacuum pump 100 including the rotary shaft 11 provided so as to extend along an upward-downward direction (vertical direction) is shown, but the direction of the rotary shaft 11 is not particularly limited. The rotary shaft 11 may be arranged in a horizontal direction or an oblique direction.

The blade support 12 is a portion of the rotary body 10 that mechanically connects the rotor blades 13 to the rotary shaft 11. The blade support 12 is connected to the first end 11a side of the rotary shaft 11. The blade support 12 extends so as to increase the inner diameter thereof toward the second end 11b side of the rotary shaft 11. That is, the blade support 12 has a roughly conical shape toward the first end 11a of the rotary shaft 11. The blade support 12 includes a tapered portion 12a that is inclined from the second end 11b side toward the first end 11a side of the rotary shaft 11. The blade support 12 includes a flange 12b extending in the radial direction from the first end 11a of the rotary shaft 11. The tapered portion 12a is mechanically connected to the outer peripheral end of the flange 12b.

The rotary body 10 includes a plurality of rotor blades 13. The rotor blades 13 are provided on the outer peripheral surface of the blade support 12. The rotor blades 13 extend in the radial direction from the outer peripheral surface of the blade support 12 to the vicinity of the inner peripheral surface of the housing 4.

As described above, the rotor blades 13 form the first pump structure 3a between the rotor blades 13 and the housing 4. The plurality of rotor blades 13 are provided in a plurality of stages at intervals in the axial direction. The plurality of rotor blades 13 are aligned along the outer peripheral surface of the tapered portion 12a and the outer peripheral surface of the flange 12b.

As shown in FIG. 1, a plurality of stator blades 71 are provided on the inner peripheral surface of the housing 4. Each stator blade 71 extends inward in the radial direction (toward the rotary shaft 11 side) from the inner peripheral surface of the housing 4. The plurality of stator blades 71 are arranged alternately with the plurality of rotor blades 13 one stage by one stage in the axial direction. Each stator blade 71 is placed on the base 4a via a spacer ring 72 stacked in the axial direction. The stacked spacer ring 72 is sandwiched between the base 4a and the case 4b such that each stator blade 71 is positioned. Thus, the pump 3 includes the first pump structure 3a including the rotor blades 13 (moving blades) of the rotary body 10 and the stator blades 71 (stationary blades) of the housing 4.

The cylindrical portion 14 has a cylindrical shape coaxial with the rotary shaft 11. The cylindrical portion 14 includes a first end 14a connected to the blade support 12 and a second end 14b on the side opposite to the blade support 12 in the axial direction of the rotary shaft 11. The cylindrical portion 14 extends linearly along the axial direction from the first end 14a connected to the tapered portion 12a to the second end 14b.

The cylindrical pump stator 73 is provided on the inner peripheral surface of the housing 4. The inner peripheral surface of the pump stator 73 faces the outer peripheral surface of the cylindrical portion 14 in the radial direction with a small interval. A thread groove (not shown) is formed on the inner peripheral surface of the pump stator 73. Thus, the pump 3 includes the second pump structure 3b including the cylindrical portion 14 of the rotary body 10 and the pump stator 73 of the housing 4. The thread groove (not shown) may be formed on either the outer peripheral surface of the cylindrical portion 14 or the inner peripheral surface of the pump stator 73.

Structure of Rotation Mechanism

In the example of FIG. 1, the rotation mechanism 20 includes two units of the magnetic bearing unit 21 and the magnetic-bearing-integrated motor 22.

The magnetic bearing unit 21 is provided around the rotary shaft 11 between the rotary shaft 11 and the blade support 12. The magnetic-bearing-integrated motor 22 is provided around the rotary shaft 11 at a position closer to the second end 11b of the rotary shaft 11 than the magnetic bearing unit 21.

As shown in FIG. 4, the magnetic bearing unit 21 includes a magnetic bearing stator 21a and a magnetic bearing rotor 21b. The magnetic bearing stator 21a is provided with a first coil 41 forming the first radial magnetic bearing 40 and a thrust coil 61 forming the thrust magnetic bearing 60. The magnetic bearing rotor 21b is configured by stacking a plurality of magnetic steel sheets in the axial direction.

Magnetic-Bearing-Integrated Motor

Figure 5:
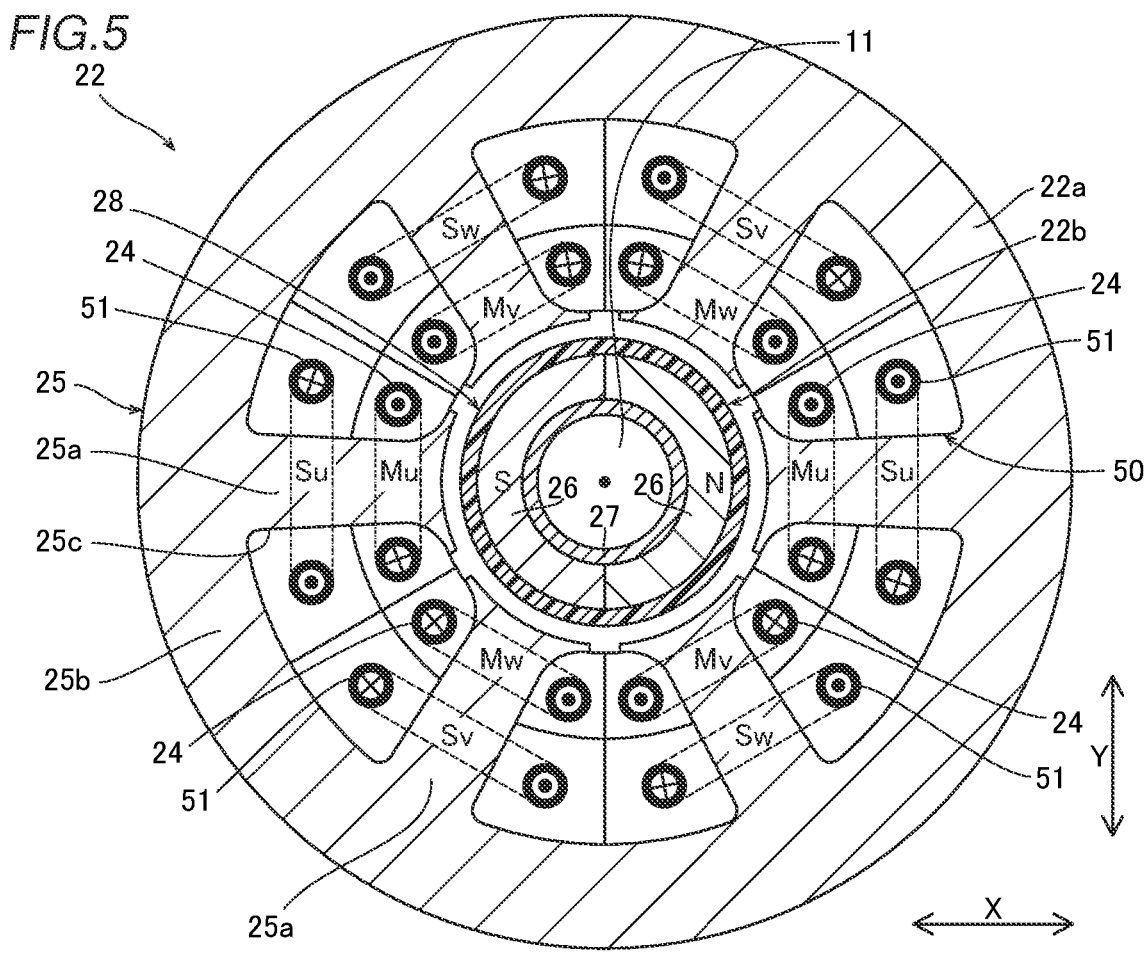
FIG. 5 is a schematic sectional view showing the motor unit as viewed in the axial direction.

As shown in FIG. 5, the magnetic-bearing-integrated motor 22 (motor stator 22a) includes motor coils 24 forming the magnetic-bearing-integrated motor 22, second coils 51 forming the second radial magnetic bearing, and a stator core 25 to which the motor coils 24 and the second coils 51 are attached in a plane orthogonal to the axial direction of the rotary shaft 11.

In other words, in the magnetic-bearing-integrated motor 22 illustrated in FIG. 5, the second coils 51 of the second radial magnetic bearing are further assembled to the motor stator 22a including the motor coils 24 and the stator core 25.

The stator core 25 includes a plurality of teeth 25a and a stator yoke 25b. The stator yoke 25b is formed in an annular shape so as to surround the rotary shaft 11. The plurality of teeth 25a extend in the radial direction from the inner peripheral surface of the stator yoke 25b toward the center of the rotary shaft 11. The plurality of teeth 25a are arranged at equal angular intervals in the circumferential direction, and a slot 25c is formed between the adjacent teeth 25a to house the coils.

The motor coils 24 and the second coils 51 are wound around the respective teeth 25a. In FIG. 5, the motor coils 24 and the second coils 51 are arranged side by side in the radial direction in the plane orthogonal to the axial direction of the rotary shaft 11. That is, both the motor coils 24 and the second coils 51 are arranged in the same slot 25c. In an example of FIG. 5, the motor coils 24 are arranged inside in the radial direction, and the second coils 51 are arranged outside in the radial direction.

The motor coils 24 and the second coils 51 are separate coils and are electrically insulated from each other. The motor coils 24 are electrically connected to the inverter 85c (see FIG. 3), and the second coils 51 are electrically connected to the inverter 85d (see FIG. 3). The inverter 85c supplies three-phase currents (U-phase, V-phase, and W-phase) to the magnetic-bearing-integrated motor 22, for example. The magnetic-bearing-integrated motor 22 includes three sets of motor coils 24 (Mu, Mv, and Mw) to which three-phase currents of U-phase, V-phase, and W-phase are supplied, respectively. The inverter 85d supplies three-phase currents (U-phase, V-phase, and W-phase) to the magnetic-bearing-integrated motor 22, for example. The magnetic-bearing-integrated motor 22 includes three sets of second coils 51 (Su, Sv, and Sw) to which three-phase currents of U-phase, V-phase, and W-phase are supplied, respectively.

The motor rotor 22b is provided on the rotary shaft 11 so as to rotate integrally with the rotary shaft 11. That is, the rotary shaft 11 is provided with permanent magnets 26 at a position (the same position in the axial direction) facing the stator core 25 in the radial direction with a gap. In the example of FIG. 5, the permanent magnet 26 magnetized to the N pole is provided over one circumferential half of the rotary shaft 11, and the permanent magnet 26 magnetized to the S pole is provided over the other circumferential half of the rotary shaft 11.

Although FIG. 5 shows an example of a 2-pole and 6-slot structure, the number of poles and the number of slots are not particularly limited. Furthermore, in FIG. 5, each winding method for the motor coils 24 and the second coils 51 is not limited to a concentrated winding method, and may be another winding method such as a distributed winding method.

The controller 81 (see FIG. 3) causes a current to be supplied to each motor coil 24 via the inverter 85c (see FIG. 3), and causes magnetic fluxes of the motor coils 24 and magnetic fluxes of the permanent magnets 26 to interact with each other. That is, the magnetic-bearing-integrated motor 22 applies attractive and repulsive acting forces to the magnetic poles of the permanent magnets 26 by the magnetic fluxes of the motor coils 24. The controller 81 generates the rotating magnetic fluxes by switching the motor coils 24 that supply a current according to the rotation angle position of the rotary body 10, and rotates the rotary body 10 at a desired rotation speed. The rotation speed of the rotary body 10 by the magnetic-bearing-integrated motor 22 is 10,000 rpm or more and 100,000 rpm or less, for example.

The controller 81 (see FIG. 3) causes a current to be supplied to the second coils 51 via the inverter 85d (see FIG. 3), and forms the coarseness and fineness of the combined magnetic flux in the gap between the rotary shaft (motor rotor 22b) and the stator core 25 (motor stator 22a) by interaction between the magnetic fluxes of the second coils 51 and the magnetic fluxes of the permanent magnets 26. Consequently, the magnetic-bearing-integrated motor 22 applies a bearing force to the rotary shaft 11 in a direction in which the magnetic fluxes of the second coils 51 and the magnetic fluxes of the permanent magnets 26 strengthen each other.

For example, in FIG. 5, magnetic fluxes of the two second coils 51 (Su) and the magnetic fluxes of the permanent magnets 26 strengthen each other in the gap on the north pole side of the motor rotor 22b, and weaken each other in the gap on the south pole side of the motor rotor 22b. Thus, the bearing force acts toward the north pole side (the right side in the figure) with a large amount of magnetic flux. FIG. 5 illustrates the U-phase second coils 51 (Su), but the strength and direction of the current supplied to each second coil 51 are controlled such that a bearing force of any strength can be generated in any radial direction. The controller 81 controls current supply to the second coils 51 based on the sensor signals of the displacement sensors 7c and 7d and the rotation sensor 8 (see FIG. 3) so as to control the bearing force of the magnetic-bearing-integrated motor 22 such that the rotary body 10 maintains a non-contact state in the radial direction.

Referring again to FIG. 4, an operation to attach the magnetic bearing unit 21 and the magnetic-bearing-integrated motor 22 to the rotary shaft 11 is now described. When the magnetic bearing unit 21 and the magnetic-bearing-integrated motor 22 are attached to the rotary shaft 11, spacer members 29 are provided so as to sandwich each of the magnetic bearing unit 21 and the magnetic-bearing-integrated motor 22. Specifically, when the magnetic bearing unit 21 and the magnetic-bearing-integrated motor 22 are attached to the rotary shaft 11, a first spacer member 29a, the magnetic bearing unit 21, a second spacer member 29b, the magnetic-bearing-integrated motor 22, and a third spacer member 29c are fitted in this order into the rotary shaft 11.

After the magnetic bearing unit 21, the magnetic-bearing-integrated motor 22, and each spacer member 29 are fitted into the rotary shaft 11, a pressure is applied to a ring 23 in the Z2 direction such that the rotation mechanism 20 is attached to the rotary shaft 11. That is, a support member 27 is sandwiched together with the spacer members 29 while a compressive load is applied in the axial direction to the first end 11a of the rotary shaft 11 and the ring 23. Furthermore, the spacer members 29 are provided as positioning members for the rotation mechanism 20.

Figure 6:
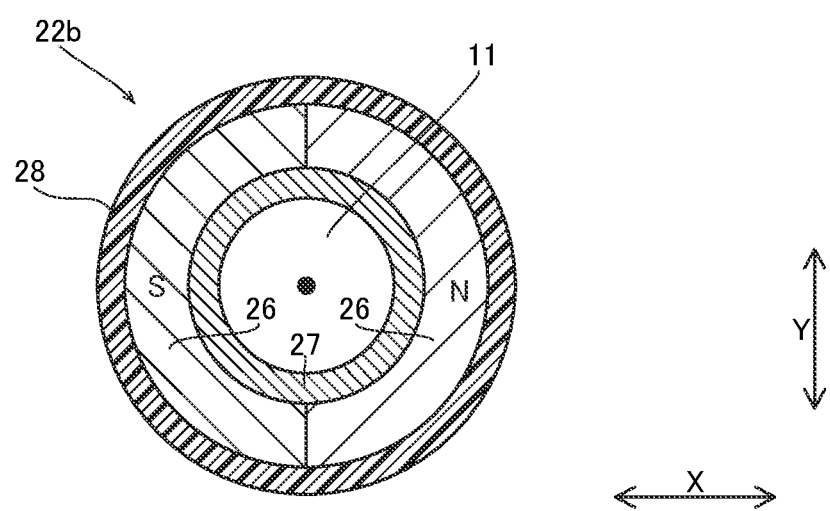
FIG. 6 is a schematic sectional view showing a motor rotor as viewed in the axial direction.

As shown in FIG. 6, the motor rotor 22b includes the permanent magnets 26, the support member 27, and a protective ring 28. The support member 27 is provided on the outer periphery of the rotary shaft 11. The permanent magnets 26 are provided so as to surround the outer circumference of the support member 27. The protective ring 28 is provided on the outer peripheries of the permanent magnets 26 in non-contact with a pair of spacer members 29 in the axial direction. In an example shown in FIG. 6, the permanent magnets 26 are provided on the support member 27 in direct contact with the support member 27.

The support member 27 is provided to receive, via the pair of spacer members 29, a pressure applied in the axial direction when the motor rotor 22b is attached to the rotary shaft 11 (during assembly). The support member 27 has an annular shape. Furthermore, the support member 27 includes a metal cylinder extending in the axial direction of the rotary shaft 11. Specifically, the support member 27 is made of stainless steel.

The protective ring 28 is provided to significantly reduce or prevent scattering of the permanent magnets 26 due to a centrifugal force generated when the motor rotor 22b is rotating. The protective ring 28 has an annular shape. The magnetic-bearing-integrated motor 22 has a motor function and a magnetic bearing function. The magnetic bearing generates a magnetic field in a predetermined direction to apply a bearing force in a predetermined direction. Therefore, when the motor rotor 22b rotates, an eddy current may be generated. When an eddy current is generated, the power consumption becomes excessive, and power for driving the motor and power for generating a bearing force for magnetic support are lost.

Therefore, in this embodiment, the protective ring 28 is made of a non-conductive material. The non-conductive material of the protective ring 28 has a lower electrical conductivity than the metal of the support member 27. Specifically, the protective ring 28 is made of a non-conductive resin. More specifically, the protective ring 28 is made of fiber-reinforced plastic. The protective ring 28 is made of carbon fiber reinforced plastic (CFRP), for example. CFRP has a high strength in a direction in which the inner carbon fibers extend and a low strength in a direction in which the carbon fibers are aligned. Therefore, the protective ring 28 is provided on the permanent magnets 26 such that the carbon fibers inside the CFRP extend along the rotation direction around the axial direction of the rotary shaft 11. Thus, it is possible to significantly reduce or prevent scattering of the permanent magnets 26 due to a centrifugal force generated by rotation of the rotary shaft 11.

In this embodiment, the permanent magnets 26 are fitted into the support member 27 and fixed with an adhesive, for example. Furthermore, the protective ring 28 is fitted into the permanent magnets 26 fitted into the support member 27 and fixed with an adhesive, for example. Then, the support member 27 to which the permanent magnets 26 and the protective ring 28 are fixed is fitted into the rotary shaft 11.

Motor Rotor

Figure 7:
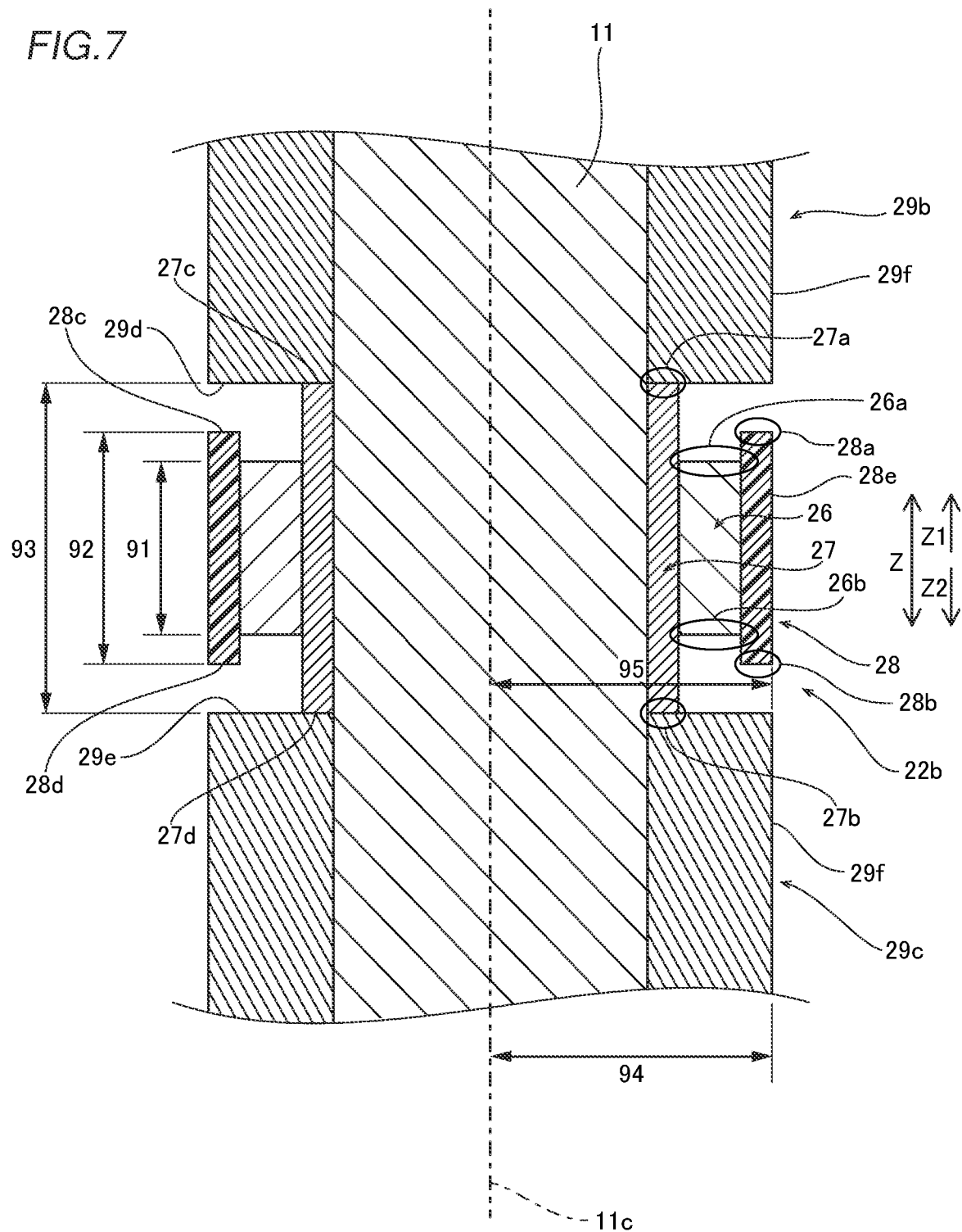
FIG. 7 is a schematic sectional view showing the motor rotor as viewed in the radial direction.

The pair of spacer members 29 (the second spacer member 29b and the third spacer member 29c) shown in FIG. 7 are arranged so as to sandwich the support member 27 in the axial direction. In this embodiment, the motor rotor 22b is attached to the rotary shaft 11 by application of a pressure in the Z2 direction to the support member 27 via the spacer member 29 (third spacer member 29c). The magnetic-bearing-integrated motor 22 is a motor for high-speed rotation. Therefore, in order to prevent a variation in the position of the motor rotor 22b or the like in the axial direction during high-speed rotation, a large pressure is applied when the motor rotor 22b is attached to the rotary shaft 11. Therefore, the mechanical strength of the rotary shaft 11 of the support member 27 in the axial direction needs to be high. Specifically, the mechanical strength of the rotary shaft 11 of the support member 27 in the axial direction needs to be higher than the mechanical strength of the protective ring 28 in the axial direction.

As shown in FIG. 7, the permanent magnets 26 each have a length 91 in the axial direction. The protective ring 28 has a length 92 in the axial direction. The support member 27 has a length 93 in the axial direction. In the axial direction, the length 93 of the support member 27 is larger than the length 92 of the protective ring 28. The length 93 and the length 92 are examples of a "first length" and a "second length" in the claims, respectively.

The protective ring 28 is arranged at a position at which a first-side end 28a of the protective ring 28 in the axial direction is located between first-side ends 26a of the permanent magnets 26 and a first-side end 27a of the support member 27. Furthermore, the protective ring 28 is arranged at a position at which a second-side end 28b of the protective ring 28 in the axial direction is located between second-side ends 26b of the permanent magnets 26 and a second-side end 27b of the support member 27. That is, in this embodiment, in the axial direction, the length 92 of the protective ring 28 is larger than the lengths 91 of the permanent magnets 26 and smaller than the length 93 of the support member 27.

In this embodiment, both end faces (end faces 27c and 27d) of the support member 27 in the axial direction contact the pair of spacer members 29, respectively. Specifically, the end face 27c of the support member 27 contacts an end face 29d of the spacer member 29. The end face 27d of the support member 27 contacts an end face 29e of the spacer member 29. That is, the support member 27 is sandwiched by the pair of spacer members 29 from both sides in the axial direction, and is fixed while a compressive load is applied thereto in the axial direction. In an example shown in FIG. 7, contact surfaces between the end faces (the end face 29d and the end face 29e) of the spacer members 29 and both end faces (the end face 27c and the end face 27d) of the support member 27 in the axial direction are flat.

In this embodiment, at least one (an end face 28c or an end face 28d) of end faces of the protective ring 28 in the axial direction does not contact at least one of the pair of spacer members 29. In the example of FIG. 7, both end faces (the end face 28c and the end face 28d) of the protective ring 28 do not contact the pair of spacer members 29, respectively. Therefore, the protective ring 28 is supported by the support member 27 via the permanent magnets 26 without receiving a compressive load in the axial direction from any of the pair of spacer members 29.

In this embodiment, in the radial direction of the rotary shaft 11, the outer surface 28e of the protective ring 28 is located at substantially the same position as the outer surfaces 29f of the pair of spacer members 29 or is located inside the outer surfaces 29f of the pair of the spacer members 29. In the example of FIG. 7, in the radial direction of the rotary shaft 11, the outer surface 28e of the protective ring 28 is located at substantially the same position as the outer surfaces 29f of the pair of spacer members 29. Specifically, a distance 94 from the rotation center 11d of the rotary shaft 11 to the outer surfaces 29f of the spacer members 29 and a distance 95 from the rotation center 11d of the rotary shaft 11 to the outer surface 28e of the protective ring 28 are substantially equal to each other.

Advantages of This Embodiment

In this embodiment, the following advantages are obtained.

In this embodiment, with the configuration described above, damage to the protective ring 28 during assembly can be significantly reduced or prevented. Furthermore, a loss caused by an eddy current generated in the protective ring 28 can be reduced. Thus, damage to the protective ring 28 during assembly can be significantly reduced or prevented, and a loss caused by an eddy current generated in the protective ring 28 can be reduced.

In this embodiment, as described above, in the axial direction, the length 93 of the support member 27 is larger than the length 92 of the protective ring 28. Accordingly, a pressure applied during assembly can be applied only to the support member 27. Consequently, damage to the protective ring 28 during assembly can be significantly reduced or prevented.

In this embodiment, as described above, the protective ring 28 is arranged at the position at which the first-side end 28a of the protective ring 28 in the axial direction is located between the first-side ends 26a of the permanent magnets 26 and the first-side end 27a of the support member 27, and the second-side end 28b of the protective ring 28 in the axial direction is located between the second-side ends 26b of the permanent magnets 26 and the second-side end 27b of the support member 27. Accordingly, in the axial direction around which the motor rotor 22b rotates, protrusion of both ends (ends 26a and 26b) of the permanent magnets 26 from both ends (ends 28a and 28b) of the protective ring 28 can be significantly reduced or prevented. Consequently, scattering of the permanent magnets 26 due to a centrifugal force can be significantly reduced or prevented when the motor rotor 22b is rotating.

In this embodiment, as described above, the pair of spacer members 29 are arranged so as to sandwich the support member 27, both end faces (end faces 27c and 27d) of the support member 27 in the axial direction contact the pair of spacer members 29, respectively, and at least one (the end face 28c or the end face 28d) of the end faces of the protective ring 28 in the axial direction does not contact at least one of the pair of spacer members 29. Accordingly, when assembly is performed by applying a pressure to the support member 27 via the spacer members 29, the pressure from the spacer members 29 can be applied only to the support member 27 instead of the protective ring 28. Consequently, application of the pressure applied during assembly to the protective ring 28 can be further significantly reduced or prevented, and thus damage to the protective ring 28 can be further significantly reduced or prevented.

In this embodiment, as described above, in the radial direction of the rotary shaft 11, the outer surface 28e of the protective ring 28 is located at substantially the same position as the outer surfaces 29f of the pair of spacer members 29 or is located inside the outer surfaces 29f of the pair of the spacer members 29. Accordingly, protrusion of the motor rotor 22b from the spacer members 29 in the radial direction of the rotary shaft 11 can be significantly reduced or prevented. Therefore, even when the motor rotor 22b and the spacer members 29 are attached to the rotary shaft 11, the amount of protrusion in the radial direction of the rotary shaft 11 can be made uniform with the amount of protrusion of the spacer members 29. Consequently, the sizes of gaps between both the motor stator 22a and the magnetic bearing unit 21 and the rotary shaft 11 occurring when the motor stator 22a and the magnetic bearing unit 21, for example, are attached become substantially constant, and thus the rotary shaft 11 can be rotated stably.

In this embodiment, as described above, the support member 27 has an annular shape. Accordingly, as compared with a configuration including a support member 27 formed by combining a plurality of members, for example, an increase in the number of components can be significantly reduced or prevented.

In this embodiment, as described above, the protective ring 28 is made of a non-conductive resin. Accordingly, as compared with a configuration including a protective ring made of ceramic, for example, an increase in the weight of the protective ring 28 can be significantly reduced or prevented. Consequently, the weight of the motor rotor 22b can be reduced while eddy current generation in the protective ring 28 is significantly reduced or prevented.

In this embodiment, as described above, the protective ring 28 is made of fiber-reinforced plastic. Accordingly, as compared with a case in which the protective ring 28 is made of a resin containing no fibers, for example, the mechanical strength of the protective ring 28 can be increased. Consequently, scattering of the permanent magnets 26 can be significantly reduced or prevented while the weight of the protective ring 28 is reduced.

In this embodiment, as described above, the magnetic-bearing-integrated motor 22 includes the motor rotor 22b including the rotary shaft 11 having an axial direction, and the motor stator 22a to apply a rotational force to rotationally drive the motor rotor 22b and a bearing force to magnetically support the motor rotor 22b, and the motor rotor 22b includes the pair of spacer members 29, the support member 27 provided on the outer circumference of the rotary shaft 11 to receive a pressure applied in the axial direction during assembly via the pair of spacer members 29, the permanent magnets 26 provided so as to surround the outer circumference of the support member 27, and the protective ring 28 having an annular shape and provided on the outer circumference of the permanent magnets 26 in non-contact with the pair of spacer members 29 in the axial direction. In the axial direction of the rotary shaft 11, the mechanical strength of the support member 27 is higher than the mechanical strength of the protective ring 28. Accordingly, it is possible to provide the magnetic-bearing-integrated motor 22 capable of reducing a loss caused by an eddy current generated in the protective ring 28, similarly to the vacuum pump 100 according to the aforementioned embodiment.

Modified Examples

The embodiment disclosed this time must be considered as illustrative in all points and not restrictive. The scope of the present invention is not shown by the above description of the embodiment but by the scope of claims for patent, and all modifications (modified examples) within the meaning and scope equivalent to the scope of claims for patent are further included.

First Modified Example

Figure 8:
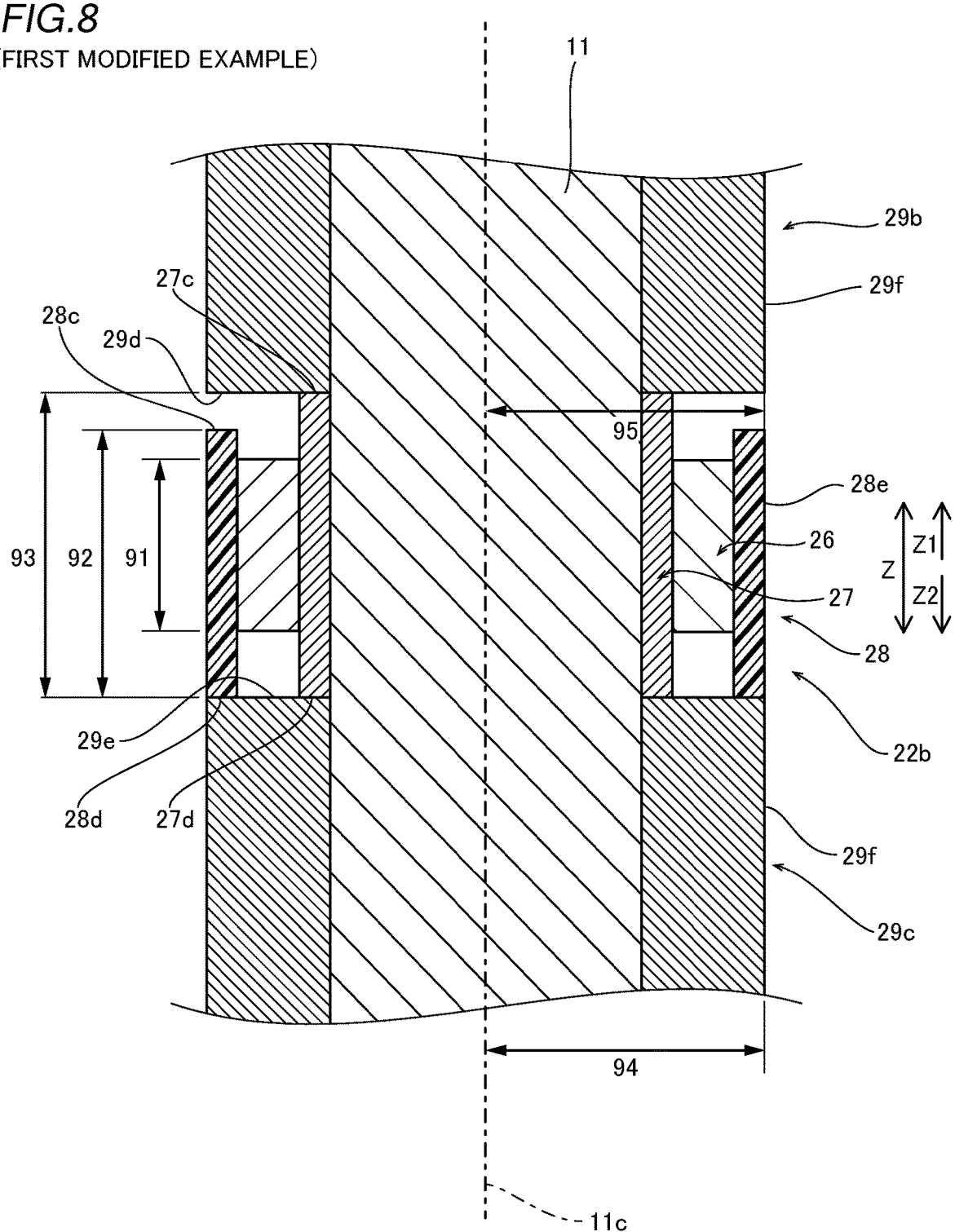
FIG. 8 is a schematic sectional view showing a motor rotor according to a first modified example, as viewed in the radial direction.

For example, while the example in which the ends 28a and 28b of the protective ring 28 do not contact the spacer members 29 has been shown in the aforementioned embodiment, the present invention is not limited to this. For example, one of the ends (ends 28a and 28b) of the protective ring 28 may contact the spacer member 29 as long as the other (end 28a or 28b) of the ends of the protective ring 28 does not contact the spacer member 29. Specifically, as shown in FIG. 8, the protective ring 28 and the spacer member 29 may contact each other due to contact of the end face 28d of the protective ring 28 with the end face 29e of the third spacer member 29c. Although not shown in the figure, the end face 28c of the protective ring 28 and the end face 29d of the second spacer member 29b may contact each other.

Second Modified Example

Figure 9:
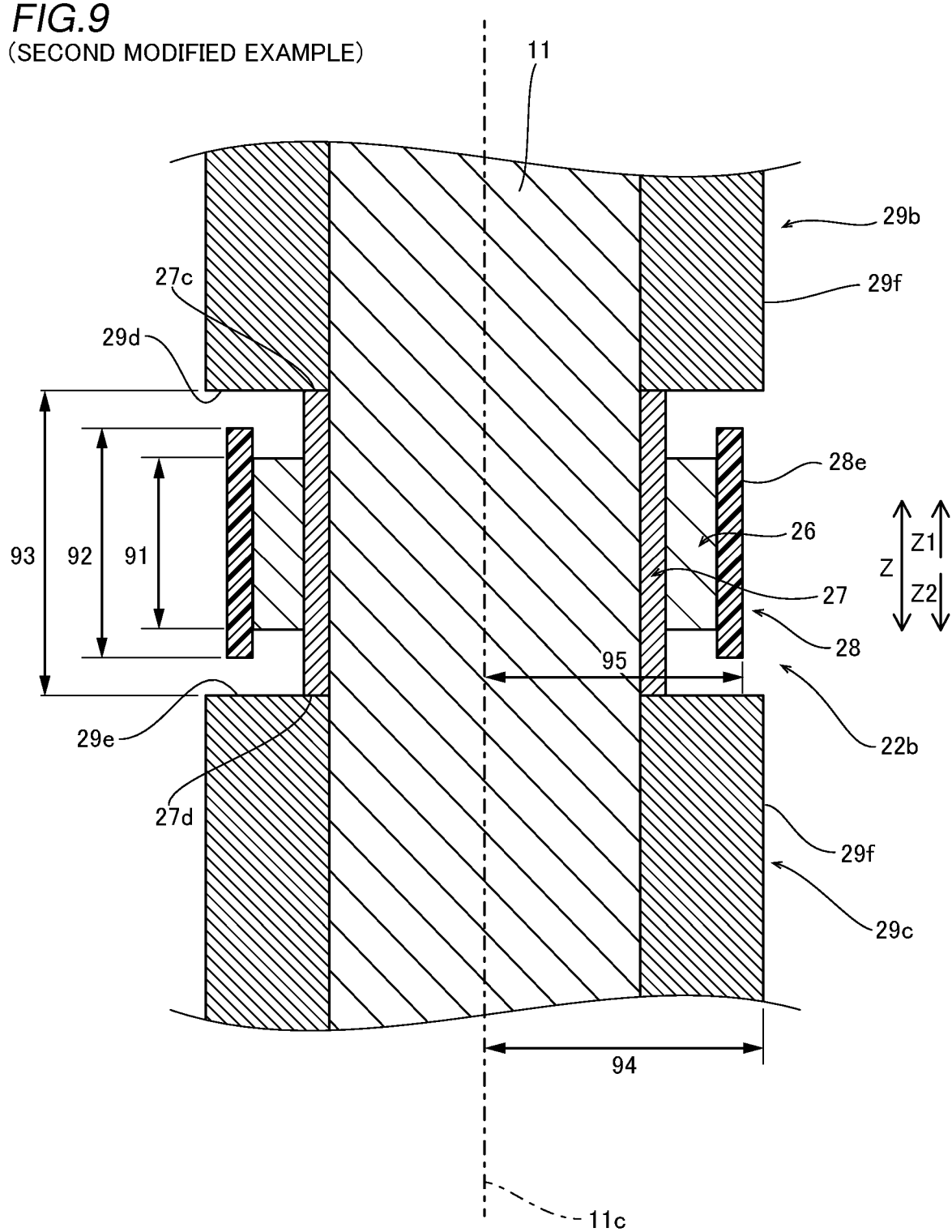
FIG. 9 is a schematic sectional view showing a motor rotor according to a second modified example, as viewed in the radial direction.

While the example in which the outer surface 28e of the protective ring 28 and the outer surfaces 29f of the spacer members 29 are located at substantially the same position has been shown in the aforementioned embodiment, the present invention is not limited to this. For example, the outer surface 28e of the protective ring 28 may be located inside the outer surfaces 29f of the pair of spacer members 29. Specifically, as shown in FIG. 9, the distance 95 from the rotation center 11d of the rotary shaft 11 to the outer surface 28e of the protective ring 28 may be smaller than the distance 94 from the rotation center 11d of the rotary shaft 11 to the outer surfaces 29f of the spacer members 29.

Third Modified Example

Figure 10:
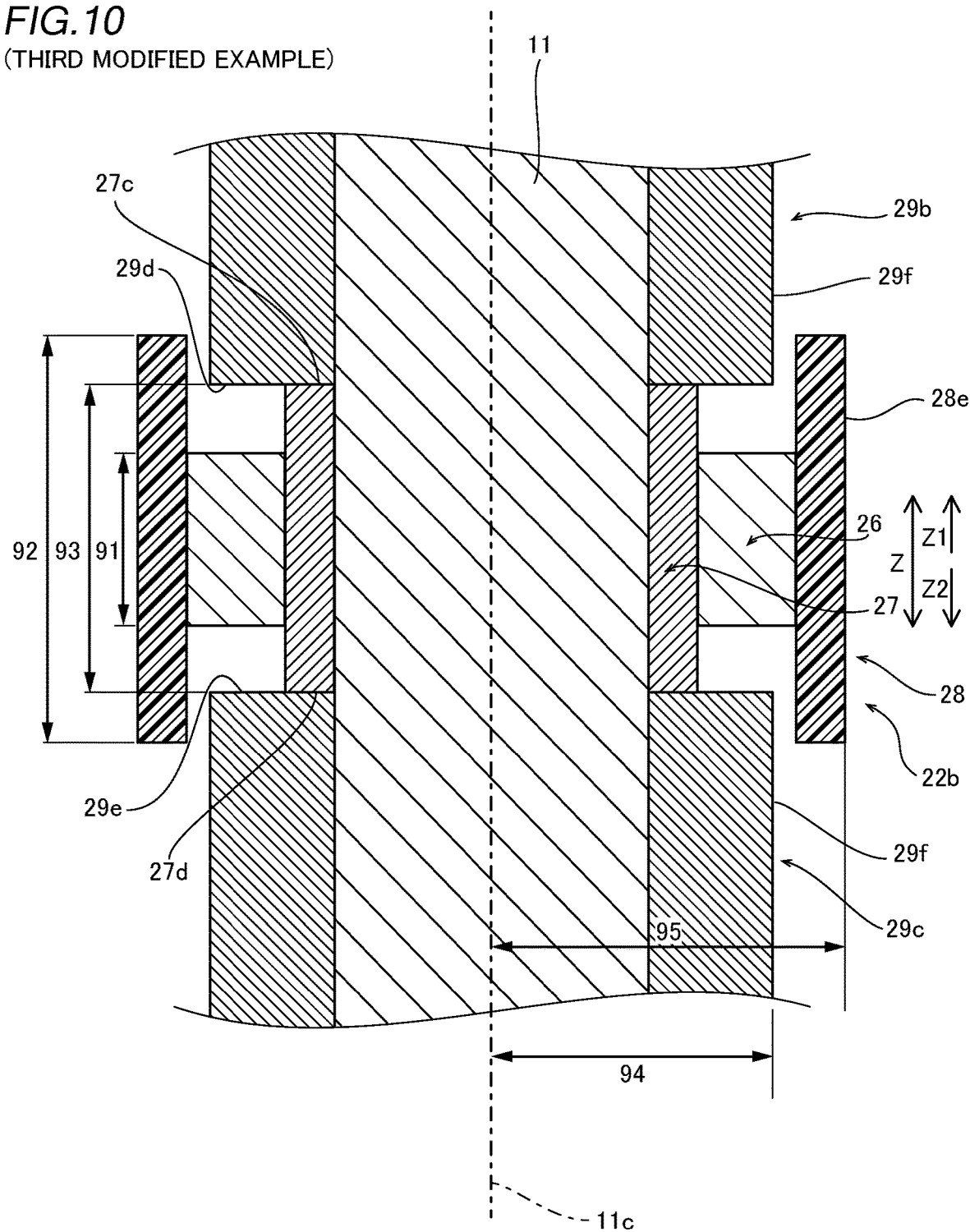
FIG. 10 is a schematic sectional view showing a motor rotor according to a third modified example, as viewed in the radial direction.

While the example in which in the axial direction, the length 92 of the protective ring 28 is shorter than the length 93 of the support member 27 has been shown in the aforementioned embodiment, the present invention is not limited to this. For example, as shown in FIG. 10, in the axial direction, the length 92 of the protective ring 28 may be larger than the length 93 of the support member 27. Specifically, as shown in FIG. 10, when the distance 95 from the rotation center 11d of the rotary shaft 11 to the outer surface 28e of the protective ring 28 is larger than the distance 94 from the rotation center 11d of the rotary shaft 11 to the outer surfaces 29f of the spacer members 29, in the axial direction, the length 92 of the protective ring 28 may be larger than the length 93 of the support member 27.

Fourth Modified Example

Figure 11:
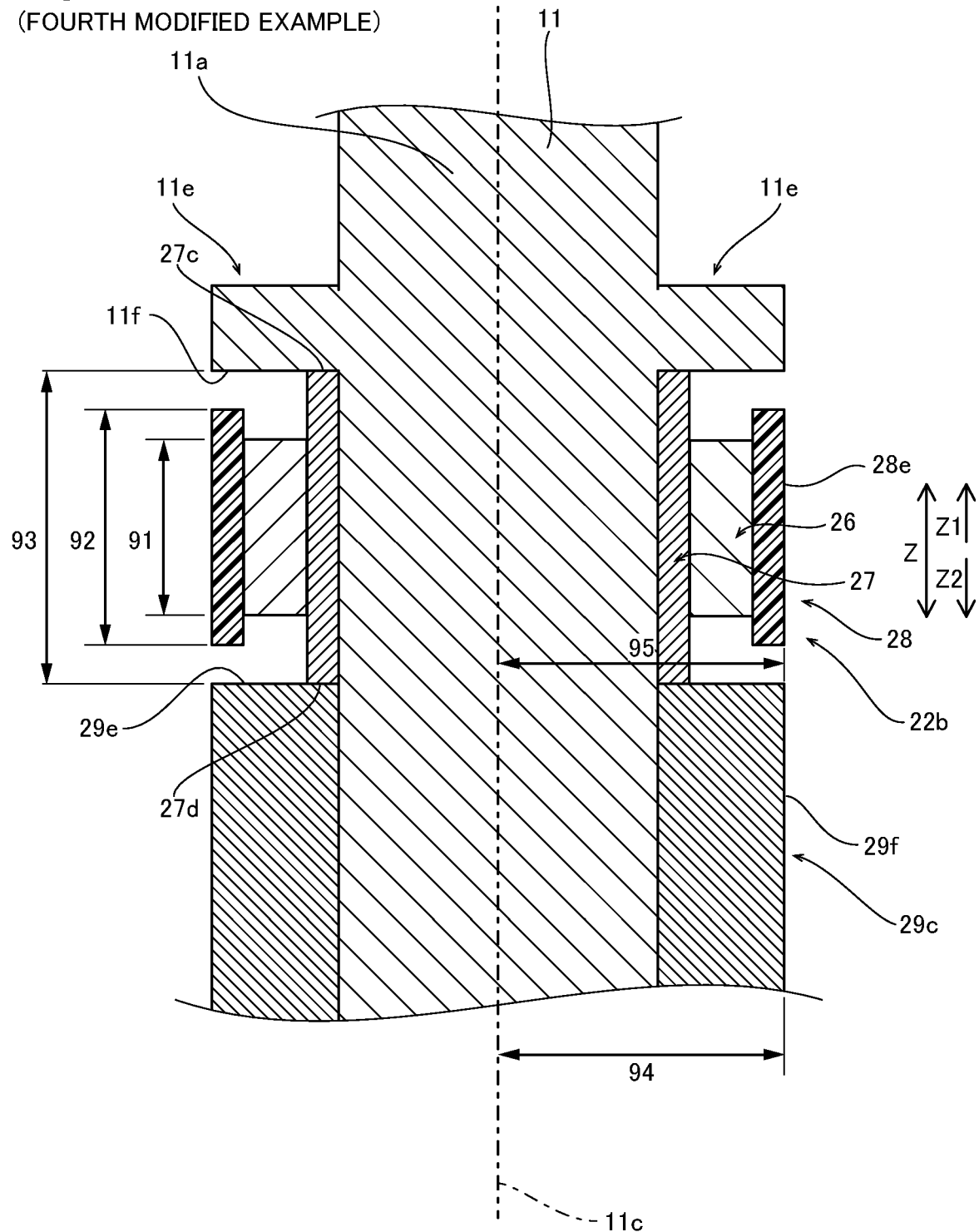
FIG. 11 is a schematic sectional view showing a motor rotor according to a fourth modified example, as viewed in the radial direction.

While the example in which the motor rotor 22b includes a pair of spacer members 29 has been shown in the aforementioned embodiment, the present invention is not limited to this. For example, as shown in FIG. 11, the rotary shaft 11 may include a rib 11e on the first end 11a side of the rotary shaft 11, and the end face 27c of the support member 27 may contact an end face 11f of the rib 11e. Even when the spacer member 29 is not provided, both ends of the row of each member fitted into the rotary shaft 11 may be sandwiched so as to contact the end face 11f of the rib 11e and the ring 23 in the axial direction and may be fixed while a compressive load in the axial direction is applied to the whole.

Fifth Modified Example

Figure 12:
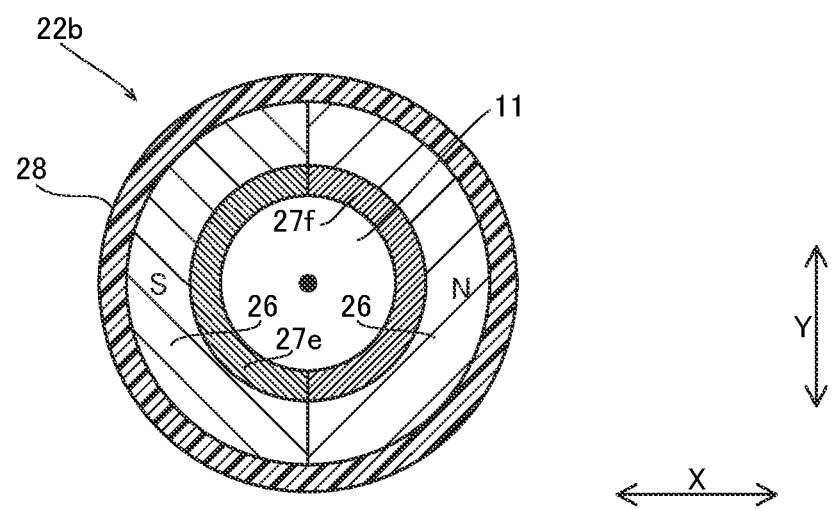
FIG. 12 is a schematic sectional view showing a motor rotor according to a fifth modified example, as viewed in the axial direction.

While the example in which the support member 27 has an annular shape has been shown in the aforementioned embodiment, the present invention is not limited to this. For example, as shown in FIG. 12, the support member 27 may include a first support member 27e and a second support member 27f each having an arcuate shape. Specifically, the support member 27 may be configured by arranging the first support member 27e and the second support member 27f on the outer circumference of the rotary shaft 11 and arranging the permanent magnets 26 and the protective ring 28 on the outer circumference.

Other Modified Examples

While the example in which the protective ring 28 is made of CFRP has been shown in the aforementioned embodiment, the present invention is not limited to this. For example, the protective ring 28 may be made of fiber-reinforced plastic such as glass-fiber reinforced plastic (GFRP) or aramid fiber-reinforced plastic (AFRP). Alternatively, the protective ring 28 may be made of a material other than fiber-reinforced plastic such as ceramic as long as scattering of the permanent magnets 26 due to a centrifugal force generated by rotation of the motor rotor 22b can be significantly reduced or prevented. However, when the protective ring 28 is made of ceramic, for example, the weight of the protective ring 28 is heavier as compared with a case in which the protective ring 28 is made of fiber-reinforced plastic, and thus the protective ring 28 is preferably made of fiber-reinforced plastic.

While the example in which the magnetic bearing unit 21 is provided on the rotary shaft 11 has been shown in the aforementioned embodiment, the present invention is not limited to this. For example, the magnetic bearing unit 21 may not be provided. When the magnetic bearing unit 21 is not provided, a mechanical bearing may be provided instead of the magnetic bearing unit 21.

While the example in which the magnetic bearing unit 21 includes the first radial magnetic bearing 40 and the thrust magnetic bearing 60 has been shown in the aforementioned embodiment, the present invention is not limited to this. For example, the first radial magnetic bearing 40 and the thrust magnetic bearing 60 may be provided separately.

While the example in which the permanent magnets 26 are provided on the support member 27 in direct contact with the support member 27 has been shown in the aforementioned embodiment, the present invention is not limited to this. For example, the permanent magnets 26 may be provided on the support member 27 in indirect contact with the support member 27 by an adhesive or the like.

Aspects

It will be appreciated by those skilled in the art that the exemplary embodiments described above are specific examples of the following aspects.

Item 1

A vacuum pump comprising:
a rotor including a rotary shaft having an axial direction;
a rotor blade provided on the rotary shaft; and
a magnetic-bearing-integrated stator including a coil configured to apply a rotational force to rotationally drive the rotor and a bearing force to magnetically support the rotor; wherein
the rotor includes:
a pair of spacer members;
a support member provided on an outer circumference of the rotary shaft to receive a pressure applied in the axial direction during assembly via the pair of spacer members;
a permanent magnet provided so as to surround an outer circumference of the support member; and
a non-conductive protective ring having an annular shape, the protective ring being provided on an outer circumference of the permanent magnet in non-contact with the pair of spacer members in the axial direction; and
in the axial direction of the rotary shaft, the support member has a mechanical strength higher than that of the protective ring.

Item 2

The vacuum pump according to item 1, wherein in the axial direction, the support member has a first length larger than a second length of the protective ring.

Item 3

The vacuum pump according to item 2, wherein the protective ring is arranged at a position at which a first-side end of the protective ring in the axial direction is located between a first-side end of the permanent magnet and a first-side end of the support member, and a second-side end of the protective ring in the axial direction is located between a second-side end of the permanent magnet and a second-side end of the support member.

Item 4

The vacuum pump according to item 1, wherein
the pair of spacer members are arranged so as to sandwich the support member;
in the axial direction, the support member has both end faces that contact the pair of spacer members, respectively; and
in the axial direction, the protective ring has at least one end face in non-contact with at least one of the pair of spacer members.

Item 5

The vacuum pump according to item 4, wherein in a radial direction of the rotary shaft, the protective ring has an outer surface located at substantially the same position as outer surfaces of the pair of spacer members or located inside the outer surfaces of the pair of spacer members.

Item 6

The vacuum pump according to item 1, wherein the support member has an annular shape.

Item 7

The vacuum pump according to item 1, wherein the protective ring is made of a non-conductive resin.

Item 8

The vacuum pump according to item 7, wherein the protective ring is made of fiber-reinforced plastic.

Item 9

A magnetic-bearing-integrated motor comprising:
a rotor including a rotary shaft having an axial direction; and
a magnetic-bearing-integrated stator including a coil configured to apply a rotational force to rotationally drive the rotor and a bearing force to magnetically support the rotor; wherein
the rotor includes:
  a pair of spacer members;
  a support member provided on an outer circumference of the rotary shaft to receive a pressure applied in the axial direction during assembly via the pair of spacer members;
  a permanent magnet provided so as to surround an outer circumference of the support member; and
  a non-conductive protective ring having an annular shape, the protective ring being provided on an outer circumference of the permanent magnet in non-contact with the pair of spacer members in the axial direction; and
in the axial direction of the rotary shaft, the support member has a mechanical strength higher than that of the protective ring.

Item 10

The magnetic-bearing-integrated motor according to item 9, wherein in the axial direction, the support member has a first length larger than a second length of the protective ring.

DESCRIPTION OF REFERENCE NUMERALS

11: rotary shaft
13: rotor blade
22: magnetic-bearing-integrated motor
22a: motor stator (magnetic-bearing-integrated stator)
22b: motor rotor (rotor)
24: motor coil (coil)
26: permanent magnet
26a: end (first-side end of the permanent magnet)
26b: end (second-side end of the permanent magnet)
27: support member
27a: end (first-side end of the support member)
27b: end (second-side end of the support member)
27c: end face (first-side end face of the support member)
27d: end face (second-side end face of the support member)
28: protective ring
28a: end (first-side end of the protective ring)
28b: end (second-side end of the protective ring)
28c: end face (first-side end face of the protective ring)
28d: end face (second-side end face of the protective ring)
29: pair of spacer members
29d: end face (first-side end face of the spacer member)
29e: end face (second-side end face of the spacer member)
51: second coil (coil)
92: length (second length)
93: length (first length)
100: vacuum pump

The invention claimed is:

1. A vacuum pump comprising:
a rotor including a rotary shaft having an axial direction;
a rotor blade provided on the rotary shaft; and
a magnetic-bearing-integrated stator including at least a first coil and configured to apply a rotational force to rotationally drive the rotor and a bearing force to magnetically support the rotor; wherein
the rotor includes:
  a pair of spacer members;
  a support member provided on an outer circumference of the rotary shaft to receive a pressure applied in the axial direction during assembly via contact with each of the pair of spacer members;
  a permanent magnet provided so as to contact and surround an outer circumference of the support member; and
  a non-conductive protective ring having an annular shape, the protective ring being provided on an outer circumference of the permanent magnet in non-contact with the pair of spacer members in the axial direction; and
in the axial direction of the rotary shaft, the support member has a mechanical strength higher than that of the protective ring, wherein:
the pair of spacer members are arranged so as to sandwich the support member in the axial direction, and
the support member, the permanent magnet, and the non-conductive protective ring are arranged in this stated order from inside in a radial direction of the rotor.

2. The vacuum pump according to claim 1, wherein in the axial direction, the support member has a first length larger than a second length of the protective ring.

3. The vacuum pump according to claim 2, wherein the protective ring is arranged at a position at which a first-side end of the protective ring in the axial direction is located between a first-side end of the permanent magnet and a first-side end of the support member, and a second-side end of the protective ring in the axial direction is located between a second-side end of the permanent magnet and a second-side end of the support member.

4. The vacuum pump according to claim 1, wherein
in the axial direction, the support member has both end faces that contact the pair of spacer members, respectively; and
in the axial direction, the protective ring has at least one end face in non-contact with at least one of the pair of spacer members.

5. The vacuum pump according to claim 4, wherein in a radial direction of the rotary shaft, the protective ring has an outer surface located at substantially a same position as outer surfaces of the pair of spacer members or located inside the outer surfaces of the pair of spacer members.

6. The vacuum pump according to claim 1, wherein the support member has an annular shape.

7. The vacuum pump according to claim 1, wherein the protective ring is made of a non-conductive resin.

8. The vacuum pump according to claim 7, wherein the protective ring is made of fiber-reinforced plastic.

9. A magnetic-bearing-integrated motor comprising:
   a rotor including a rotary shaft having an axial direction; and
   a magnetic-bearing-integrated stator including at least a first coil and configured to apply a rotational force to rotationally drive the rotor and a bearing force to magnetically support the rotor; wherein
   the rotor includes:
      a pair of spacer members;
      a support member provided on an outer circumference of the rotary shaft to receive a pressure applied in the axial direction during assembly via contact with each of the pair of spacer members;
      a permanent magnet provided so as to contact and surround an outer circumference of the support member; and
      a non-conductive protective ring having an annular shape, the protective ring being provided on an outer circumference of the permanent magnet in non-contact with the pair of spacer members in the axial direction; and
   in the axial direction of the rotary shaft, the support member has a mechanical strength higher than that of the protective ring, wherein:
   the pair of spacer members are arranged so as to sandwich the support member in the axial direction, and
   the support member, the permanent magnet, and the non-conductive protective ring are arranged in this stated order from inside in a radial direction of the rotor.

10. The magnetic-bearing-integrated motor according to claim 9, wherein in the axial direction, the support member has a first length larger than a second length of the protective ring.

11. A vacuum pump comprising:
   an intake port positioned to receive a gas;
   a rotor including a rotary shaft extending in an axial direction;
   a rotor blade provided on the rotary shaft and configured to suck in the gas through the intake port;
   an exhaust port configured to output the gas; and
   a magnetic-bearing-integrated stator configured to apply a rotational force to rotationally drive the rotor and a bearing force to magnetically support the rotor; wherein:
   the rotor includes:
      a first spacer member and a second spacer member, the first spacer member having a first axial end surface and the second spacer member having a second axial end surface spaced apart from and facing the first axial end surface in the axial direction;
      a support member provided on an outer circumference of the rotary shaft and contacting the first spacer member and second spacer member, the support member being sandwiched in the axial direction between the first spacer member and the second spacer member;
      a permanent magnet provided so as to surround an outer circumference of the support member and to also be sandwiched in the axial direction between the first spacer member and the second spacer member; and
      a non-conductive protective ring having an annular shape, the protective ring being provided on an outer circumference of the permanent magnet to have a first axial end surface facing the first axial end surface of the first spacer member and a second axial end surface facing the second axial end surface of the second spacer member, at least one of the first axial end surface and the second axial end surface of the non-conductive protective ring being in non-contact with a corresponding first or second axial end surface of the first or second spacer member.

12. The vacuum pump of claim 11, wherein:
   the first axial end surface of the first spacer member contacts a first axial end surface of the support member; and
   the second axial end surface of the second spacer member contacts a second axial end surface of the support member.

13. The vacuum pump according to claim 11, wherein in the axial direction, a length of the support member is greater than a length of the protective ring.

14. The vacuum pump according to claim 13, wherein in the axial direction, the length of the protective ring is greater than a length of the permanent magnet.

15. The vacuum pump according to claim 11, wherein the support member is configured to receive a pressure applied in the axial direction via the first and second spacer members during assembly.

16. The vacuum pump according to claim 11, wherein in the axial direction of the rotary shaft, the support member has a mechanical strength higher than that of the protective ring.

* * * * *